US012221018B2

(12) United States Patent
Okumura (10) Patent No.: US 12,221,018 B2
(45) Date of Patent: Feb. 11, 2025

(54) CABLE TAKE-UP DEVICE, AND FLAT CABLE ROUTING STRUCTURE FOR SLIDE SEAT

(71) Applicants: FURUKAWA ELECTRIC CO., LTD., Tokyo (JP); FURUKAWA AUTOMOTIVE SYSTEMS INC., Inukami-gun (JP)

(72) Inventor: Masahiro Okumura, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 341 days.

(21) Appl. No.: 17/947,228

(22) Filed: Sep. 19, 2022

(65) Prior Publication Data

US 2023/0015236 A1   Jan. 19, 2023

Related U.S. Application Data

(63) Continuation of application No. PCT/JP2021/011643, filed on Mar. 22, 2021.

(30) Foreign Application Priority Data

Mar. 24, 2020  (JP) .................................. 2020-052256

(51) Int. Cl.
*B60N 2/06*     (2006.01)
*B60N 2/015*    (2006.01)
(Continued)

(52) U.S. Cl.
CPC ............... *B60N 2/06* (2013.01); *B60N 2/015* (2013.01); *B65H 75/4471* (2013.01); *H02G 11/02* (2013.01)

(58) Field of Classification Search
CPC ....... B60N 2/06; B60N 2/0264; B60R 16/023; H02G 11/02; B65H 75/364; B65H 75/486; B65H 75/4471; B65H 2701/34
(Continued)

(56) References Cited

U.S. PATENT DOCUMENTS 6,267,430 B1 * 7/2001 Cresseaux ............ B60N 2/0732
                                                    296/65.01
9,550,460 B2 * 1/2017 Tsubaki .............. B60R 16/0215
(Continued)

FOREIGN PATENT DOCUMENTS

EP    3 770 022 A1    1/2021
JP    2005-059745 A   3/2005
(Continued)

OTHER PUBLICATIONS

Extended European Search Report issued Mar. 12, 2024, in corresponding European Patent Application No. 21775106.4, 8 pages.
(Continued)

*Primary Examiner* — Dennis H Pedder
(74) *Attorney, Agent, or Firm* — Oblon, McClelland, Maier & Neustadt, L.L.P.

(57) ABSTRACT

Provided is a cable take-up device for a flexible flat cable routed for a slide seat slidably supported so as to be movable forward and backward along a fixed rail fixed to the vehicle cabin floor. The cable take-up device includes: a take-up housing part that takes up a housed portion in a drawable manner and houses it inside with a front end portion fixed to a rail front end portion and a rear end portion fixed to the slide seat; a take-up force generation part that generates a take-up force in a direction of take-up of the housed portion through drawing of the cable routing body; and a slit that applies the take-up force of the take-up force generation part to the housed portion.

15 Claims, 7 Drawing Sheets

(51) Int. Cl.
  *B65H 75/44*   (2006.01)
  *H02G 11/02*   (2006.01)
(58) Field of Classification Search
  USPC ......... 296/65.13–65.15, 65.18; 248/429, 430
  See application file for complete search history.

(56) References Cited

U.S. PATENT DOCUMENTS

| | | | |
|---|---|---|---|
| 9,653,902 B2* | 5/2017 | Katsuramaki | .......... H02G 11/02 |
| 10,707,668 B2* | 7/2020 | Sano | ...................... B60R 16/027 |
| 2005/0035622 A1 | 2/2005 | Tsubaki et al. | |
| 2019/0382230 A1* | 12/2019 | Hamada | ................ B60R 16/027 |

FOREIGN PATENT DOCUMENTS

| | | |
|---|---|---|
| JP | 2010-172116 A | 8/2010 |
| JP | 2013-153556 A | 8/2013 |
| WO | WO 2010/103904 A1 | 9/2010 |
| WO | WO 2019/188811 A1 | 10/2019 |

OTHER PUBLICATIONS

Korean Office Action issued May 22, 2024 in Korean Patent Application No. 10-2022-7035958 (with English Translation), 5 pages.
International Search Report issued Jun. 15, 2021 in PCT/JP2021/011643 filed on Mach 22, 2021, 5 pages (with English Translation).

* cited by examiner

CABLE TAKE-UP DEVICE, AND FLAT CABLE ROUTING STRUCTURE FOR SLIDE SEAT

TECHNICAL FIELD

The disclosure relates to a cable take-up device of a flexible flat cable for supplying power that is routed for a slide seat slidably supported so as to be movable back and forth along a longitudinal direction of a fixed rail fixed to a vehicle body, and to a flat cable routing structure for the slide seat, for example.

BACKGROUND

In the related art, a number of power supply devices have been proposed for supplying power to a slide seat slidably supported so as to be movable back and forth along a longitudinal direction of a fixed rail fixed to a vehicle body.

As one of such power supply devices, the slide seat power supply device disclosed in PTL 1 includes a flexible drawing belt and a spring unit including a spiral spring inside.

The flexible drawing belt extends along the flat cable, with the front end side of the drawing belt fixed to the flat cable end side.

The spring unit is configured such that the base end portion of the flat cable is wound around the outer periphery and that the unwound drawing belt is wound back by the spiral spring.

The flat cable forms a take-up part by take-up the base end side portion of the flat cable in a spiral form around the base end portion of the flat cable.

In this manner, when the slide seat moves on the fixed rail, the flat cable can follow the slide of the slide seat.

In the above-described slide seat power supply device, however, the spiral spring and the take-up part are disposed parallel to each other, and as such the size of the spring unit is large, making it difficult to reduce the size of the power supply device of the slide seat.

PRIOR ART DOCUMENT

Patent Document

[PTL 1] Japanese Patent Application Laid-Open No. 2005-59745

SUMMARY

Problems to be Solved by the Invention

To solve the above-described problems, an object of the disclosure is to provide a cable take-up device with a compact structure that can supply power to a slide seat, and a flat cable routing structure for the slide seat.

Means to Solve the Problem

The disclosure is a cable take-up device for a flexible flat cable routed for a slide seat slidably supported to be movable forward and backward along a longitudinal direction of a fixed rail fixed to a vehicle body, the cable take-up device including a take-up housing part configured to take up a housed portion in a drawable manner and house the housed portion inside the take-up housing part with a first cable end portion fixed to a side of a first rail end portion and a second cable end portion fixed to the slide seat, the first cable end portion being one end portion of the flexible flat cable, the first rail end portion being one end of the fixed rail, the second cable end portion being another end portion of the flexible flat cable, the housed portion being a portion of the flexible flat cable between the first cable end portion and the second cable end portion, a fixing shaft disposed along a take-up center axis direction of the take-up housing part inside the take-up housing part, a rotation regulator configured to apply take-up force to the housed portion by being rotated around the fixing shaft inside the take-up housing part, a spring case fixed to the rotation regulator inside the take-up housing part and configured to be rotated around the fixing shaft together with the rotation regulator, and a spiral spring grabbed by the spring case and the fixing shaft inserted to the spring case, the spiral spring configured to generate take-up force in a direction of take-up of the housed portion through drawing of the flexible flat cable, wherein one of the first cable end portion and the second cable end portion is output to an outside from a take-up center of the take-up housing part, and the spring case in which the spiral spring is housed is fixed to a side surface part of the rotation regulator on an opposite side opposite to a side on which the one of the first cable end portion and the second cable end portion is output to the outside in the take-up center axis direction.

In addition, a flat cable routing structure for a slide seat of the disclosure includes the cable take-up device, the fixed rail fixed to the vehicle body, a moving body configured to slidably support the slide seat such that the slide seat is movable back and forth along a longitudinal direction of the fixed rail, the cable take-up device being fixed to the moving body, and the flexible flat cable configured to be taken up by the cable take-up device in a drawable manner with the first cable end portion fixed on the side of the first rail end portion and the second cable end portion fixed to the slide seat, wherein the flexible flat cable is routed for the slide seat slidably supported so as to be movable back and forth along a longitudinal direction of the fixed rail.

The above-described flexible flat cable may be composed of one flexible flat cable or a plurality of stacked flexible flat cables. Furthermore, the above-described flexible flat cable may be stacked with a flexible flat cable called a dummy cable provided with no conductor, or may be stacked with a belt-shape member different from the flexible flat cable.

The longitudinal direction of the above-described fixed rail fixed to the vehicle body is typically the front-rear direction of the vehicle body, and accordingly the back-forth direction is typically the front-rear direction of the vehicle body. Thus, when the first rail end portion, which is one end of the fixed rail, is the end portion of the vehicle body front side, the forward direction is the vehicle body front direction and the backward direction is the vehicle body rear direction. Conversely, when the first rail end portion, which is one end of the fixed rail, is the end portion of the vehicle body rearward side, the forward direction is the vehicle body rear direction and the backward direction is the vehicle body front direction.

The above-described first cable end portion as one end portion of the flexible flat cable and the above-described second cable end portion as another end portion of the flexible flat cable are not physical end portions of the flexible flat cable, but are end portions fixed to a predetermined portion on the first rail end portion side and the slide seat in the state where the intermediate portion of the flexible flat cable is disposed between the slide seat and the predetermined portion on the first rail end portion side.

The above-described take-up center is the center of take-up of the flexible flat cable.

According to this disclosure, the cable take-up device, with a compact structure, can supply power to the slide seat with the flexible flat cable.

Specifically, the cable take-up device includes the take-up housing part, the fixing shaft, the rotation regulator, the spring case, and the spiral spring.

The take-up housing part takes up the housed portion of the flexible flat cable in a drawable manner and houses the housed portion inside. The fixing shaft is disposed along the take-up center axis direction of the take-up housing part, and the rotation regulator is rotated around the fixing shaft so as to apply the take-up force to the housed portion.

The spring case is fixed to the rotation regulator and rotated around the fixing shaft together with the rotation regulator. The spiral spring is grabbed by the spring case and the fixing shaft and generates the take-up force of the direction of take-up of the housed portion through drawing of the flexible flat cable. Further, the spring case housing the spiral spring is fixed to the side surface part of the rotation regulator on the side opposite to the side on which one of the first cable end portion and the second cable end portion is output to the outside from the take-up center in the take-up housing part.

In this manner, it is possible to form, in a compact form, the cable take-up device that can supply power following the movement of the slide seat by take-up and drawing the flexible flat cable with the take-up force of the spiral spring with respect to the slide of the slide seat with respect to the fixed rail.

As an aspect of the disclosure, the rotation regulator may include a regulation part configured to regulate an intermediate portion of the housed portion, of the housed portion, a portion disposed on a radial inside of the regulation part may be defined as an inner installation portion and a portion disposed on a radial outside of the regulation part may be defined as an outer installation portion, the inner installation portion and the outer installation portion of the housed portion are wound in the same direction and housed, and the inner installation portion may be wound up when the outer installation portion is unwound whereas the inner installation portion may be wound down when the outer installation portion is wound.

The above-described "winding" means winding in a spiral form.

The above-described "unwinding" means a state where the outer installation portion of the flexible flat cable is drawn from the take-up housing part and the number of windings is reduced, and the above-described "taken up" means a state where the outer installation portion of the flexible flat cable is wound and pulled back to the take-up housing part and the number of windings increases.

The above-described "wound down" means a state where the distance between the wound flat cables is spread while the number of windings of the inner installation portion of the flexible flat cable is unchanged. In addition, the above-described "wound up" means a state where the distance between the wound flat cables is reduced while the number of windings of the inner installation portion of the flexible flat cable is unchanged.

According to this disclosure, along with the movement of the slide seat, the outer installation portion at the housed portion can be drawn and wound by unwinding. In addition, the inner installation portion can be wound up and wound down through the drawing and take-up of the outer installation portion in conjunction with the movement of the slide seat.

That is, when the outer installation portion is unwound, the inner installation portion wound in the same direction can be wound up, and when the outer installation portion is wound, the inner installation portion wound in the same direction can be wound down.

In addition, when the outer installation portion at the housed portion is unwound and drawn from the take-up housing part along with the movement of the slide seat, the inner installation portion is wound up on the radial inside of the regulation part, and thus the restoration force of the wound-up inner installation portion acts on the outer installation portion in the direction opposite to the drawing direction.

Additionally, if the take-up of the inner installation portion is completed when the outer installation portion is unwound and drawn from the take-up housing part, it is possible to regulate a situation where the outer installation portion is further unwound and drawn with the wound-up inner installation portion.

That is, the wound-up inner installation portion operates as a so-called stopper at the time of further drawing the outer installation portion, and thus excessive drawing of the outer installation portion can be prevented.

Conversely, when the outer installation portion is taken up and pulled back to the take-up housing part along with the movement of the slide seat, the inner installation portion is wound down on the radial inside of the regulation part so as to make contact with the regulation part, and the resilience of the unwound inner installation portion acts on the outer installation portion in the direction opposite to the pulling back direction.

Thus, the resilience of the inner installation portion wound down and brought into contact with the regulation part acts on the outer installation portion, it is possible to regulate a situation where the outer installation portion is further taken up and pulled back to the take-up housing part.

That is, the wound-down inner installation portion operates as a so-called stopper at the time of further pulling back the outer installation portion, and thus excessive pull-back of the outer installation portion can be prevented.

In this manner, the inner installation portion is wound up and wound down through the drawing and pulling of the outer installation portion. In this manner, the elastic force acting on the inner installation portion acts on the drawn or pulled-back outer installation portion in the opposite direction, and thus the force in the direction of the drawing and pulling of the outer installation portion can be relieved.

Further, the inner installation portion can operate as a so-called stopper at the time of drawing or pulling back the outer installation portion.

In addition, as an aspect of the disclosure, the rotation regulator may include a regulation part configured to regulate an intermediate portion of the housed portion, of the housed portion, a portion disposed on a radial inside of the regulation part may be defined as an inner installation portion and a portion disposed on a radial outside of the regulation part may be defined as an outer installation portion, the inner installation portion and the outer installation portion of the housed portion may be wound in opposite directions and housed, and the inner installation portion may be wound down when the outer installation portion is unwound whereas the inner installation portion may be wound up when the outer installation portion is wound.

According to this disclosure, along with the movement of the slide seat, the outer installation portion at the housed portion can be drawn and wound by unwinding. In addition, the inner installation portion can be wound down and wound up through the drawing and take-up of the outer installation portion in conjunction with the movement of the slide seat.

That is, the inner installation portion is wound down when the outer installation portion is unwound, and the inner installation portion is wound up when the outer installation portion is wound. Thus, the circumference difference between the wound outer installation portion and inner installation portion can be accommodated.

Additionally, if the take-up of the inner installation portion is completed when the outer installation portion is taken up and pulled back to the take-up housing part, it is possible to regulate a situation where the outer installation portion is further pulled back with the wound-up inner installation portion.

That is, the wound-up inner installation portion operates as a so-called stopper at the time of pulling back the outer installation portion, and thus excessive pull-back of the outer installation portion can be prevented.

Conversely, when the outer installation portion is unwound and drawn from the take-up housing part along with the movement of the slide seat, the inner installation portion is wound down on the radial inside of the regulation part to make contact with the regulation part, and the resilience of the unwound inner installation portion acts on the outer installation portion in the direction opposite to the drawing direction.

In this manner, the resilience of the inner installation portion wound down and brought into contact with the regulation part acts on the outer installation portion, and thus it is possible to regulate a situation where the outer installation portion is further unwound and drawn from the take-up housing part.

That is, the wound-down inner installation portion operates as a so-called stopper at the time of drawing the outer installation portion, and thus excessive drawing of the outer installation portion can be prevented.

In addition, as an aspect of the disclosure, a partition wall may be provided between the inner installation portion and the outer installation portion, a passage part through which the housed portion passes in a radial direction may be provided in the partition wall, and the passage part may include the regulation part.

According to this disclosure, the inner installation portion and the outer installation portion can be separated from each other in the radial direction with the partition wall, and the take-up force can be applied to the housed portion at the passage part by passing the housed portion through the passage part provided in the partition wall.

In addition, as an aspect of the disclosure, the side surface part may be provided on the opposite side in the rotation regulator, the partition wall may be provided at the side surface part, and the side surface part may rotate relative to the take-up housing part.

According to this disclosure, the partition wall that sections the inner installation portion and the outer installation portion in the radial direction rotates integrally with the side surface part, and thus the take-up force can reliably rotate the inner installation portion so as to wind up and wind down the inner installation portion.

In addition, as an aspect of the disclosure, a plurality of the flexible flat cables may be stacked, and a bundling part configured to bundle the housed portion that is stacked may be provided at the inner installation portion near a boundary between the inner installation portion and the outer installation portion.

According to the disclosure, the stacked flexible flat cable does not spread out, and the inner installation portion can be wound up and wound down on the radial inside of the regulation part.

In addition, as an aspect of the disclosure, the spiral spring may generate the take-up force by being wound up through unwinding of the outer installation portion.

According to this disclosure, the spiral spring with a simple structure can reliably generate the take-up force, and power can be supplied following the movement of the slide seat by take-up of the spiral spring by take-up and drawing the flexible flat cable with the take-up force of the spiral spring.

In addition, as an aspect of the disclosure, the outer installation portion may be formed to be longer than a take-up-up length of the spiral spring.

According to this disclosure, the spiral spring with a simple structure can reliably generate the take-up force, and power can be supplied following the movement of the slide seat by take-up of the spiral spring by take-up and drawing the flexible flat cable with the take-up force of the spiral spring. In addition, since the outer installation portion is longer than the take-up-up length of the spiral spring, it is possible to prevent a situation where the outer installation portion is damaged by being wound over the take-up amount and the unwinding amount as in the case where the take-up-up length of the spiral spring is longer.

In addition, as an aspect of the disclosure, the take-up housing part may be fixed to one of end portions of the fixed rail, or a moving body configured to support the slide seat and slide in a back-forth direction with respect to the fixed rail.

According to this disclosure, the cable take-up device configured in a compact form can supply power following the movement of the slide seat by take-up and drawing the flexible flat cable with the take-up force of the spiral spring along with the slide of the slide seat with respect to the fixed rail.

Effects of the Invention

According to this disclosure, it is possible to provide a cable take-up device with a compact structure that can supply power to a slide seat, and a flat cable routing structure for the slide seat.

BEST MODE FOR CARRYING OUT THE INVENTION

Embodiments of the disclosure are specifically described below with reference to the drawings.

Figure 1:
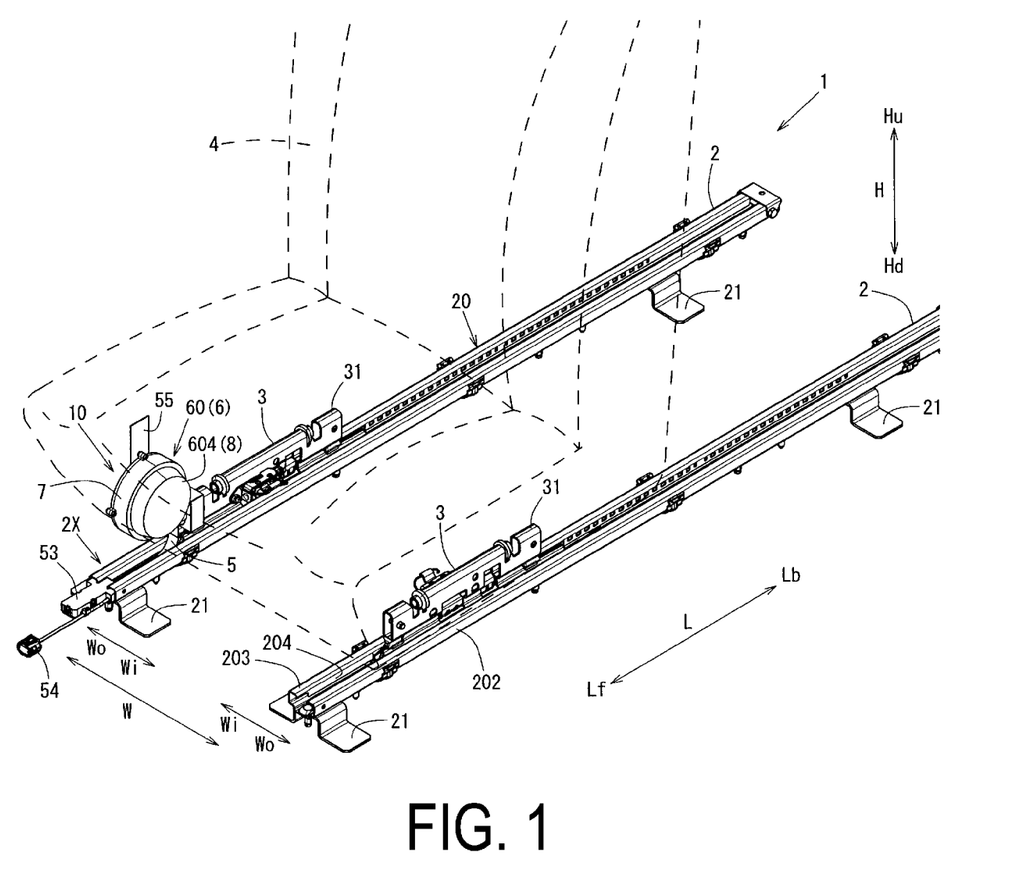
FIG. 1 is a schematic perspective view of a seat slide structure.
Figure 2:
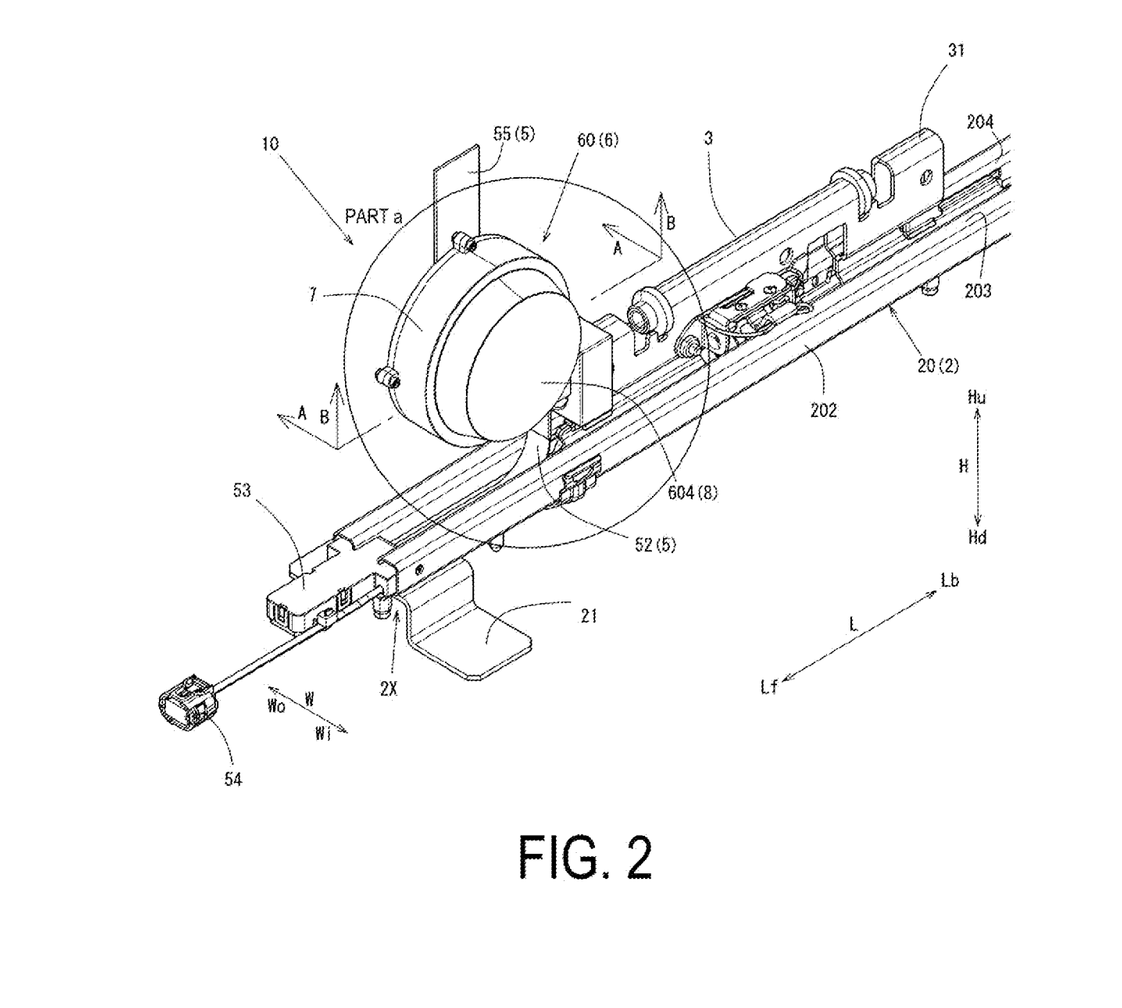
FIG. 2 is a schematic perspective view of a flat cable routing structure.
Figure 3:
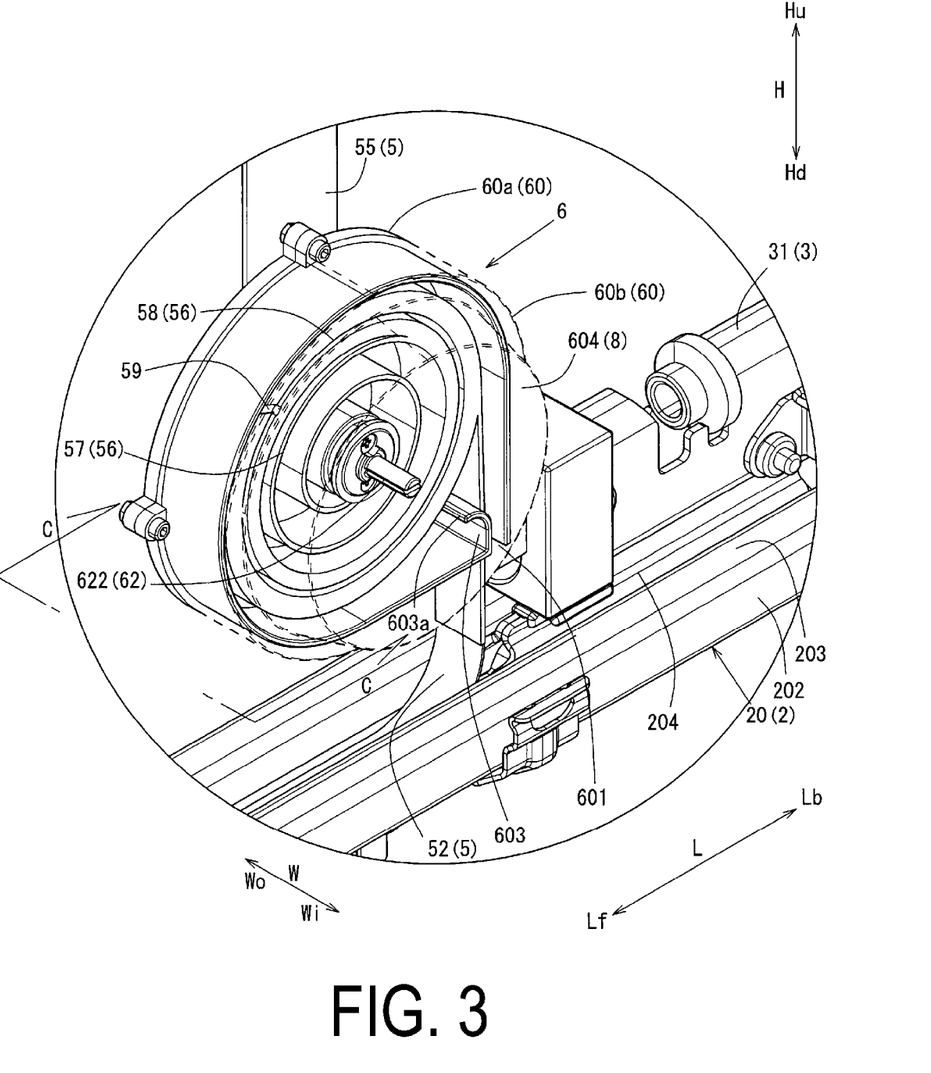
FIG. 3 is an enlarged cross-section perspective view of a part a of FIG. 2 taken along line A-A.
Figures 4A, 4B:
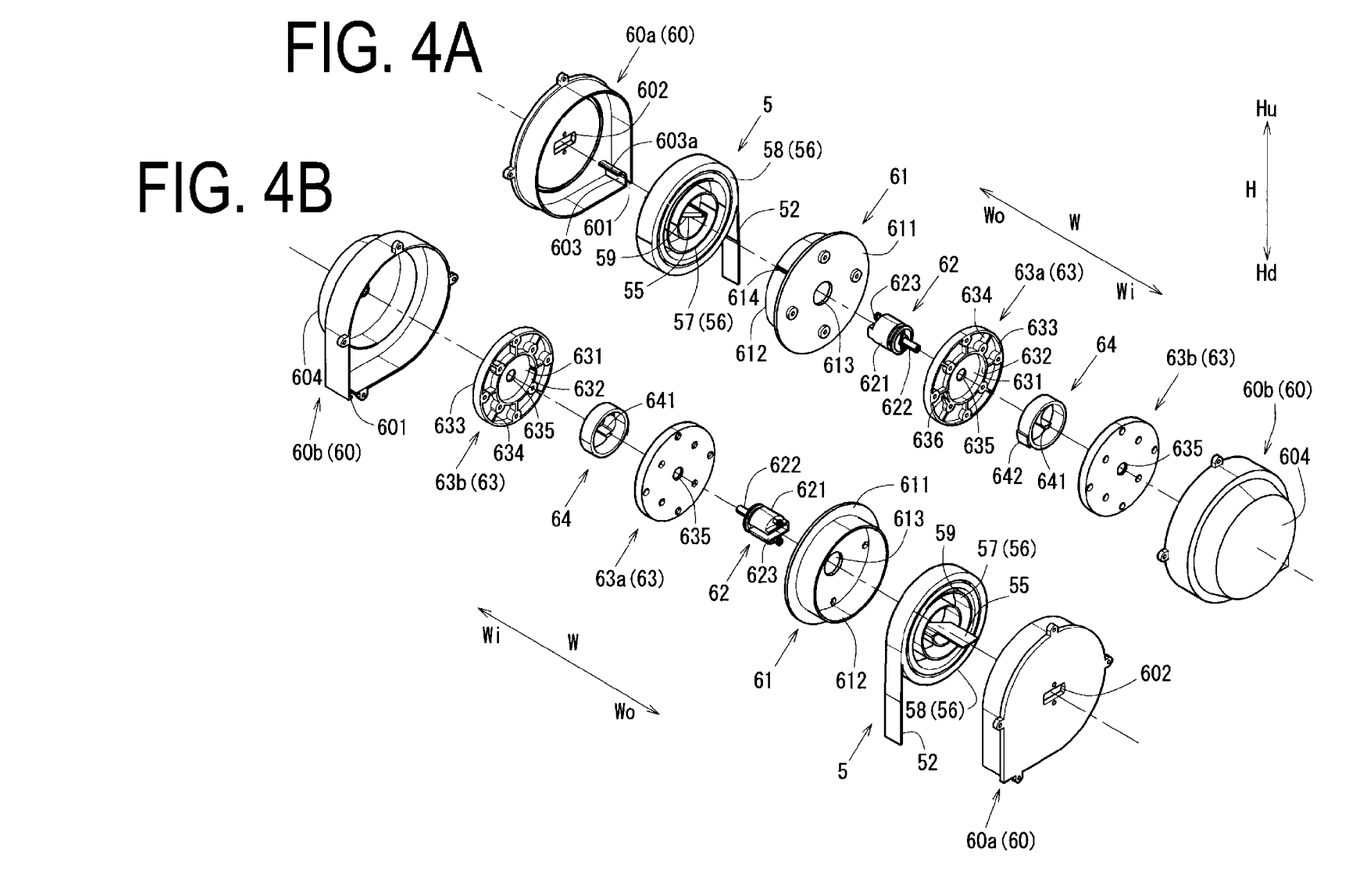
FIG. 4 is an explanatory diagram of an exploded perspective view of a cable take-up device.
Figure 5:
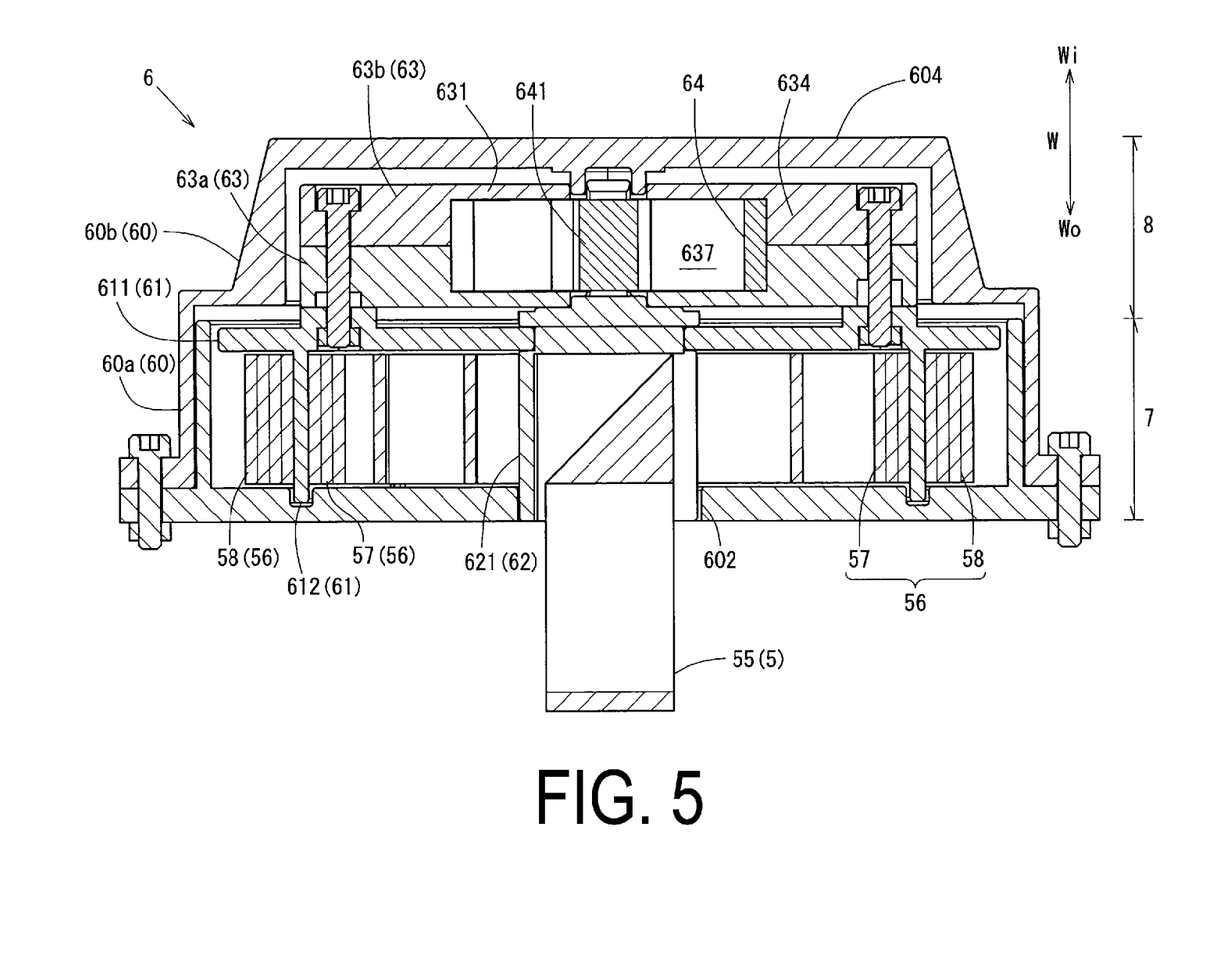
FIG. 5 is an enlarged sectional view taken along line B-B of FIG. 2.
Figure 6A:
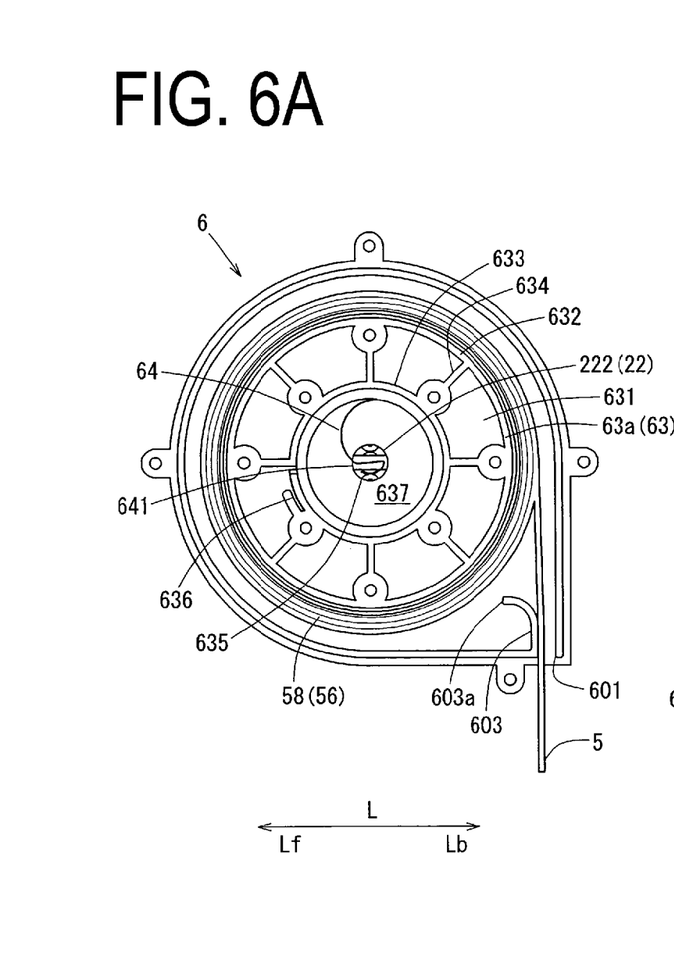
FIG. 6 is an explanatory diagram of a cable take-up device.
Figure 6B:
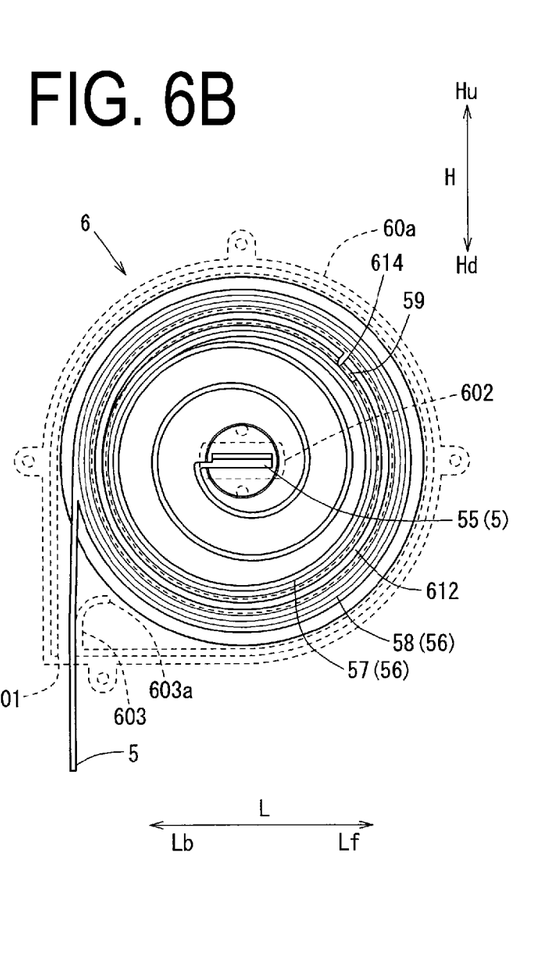
Figure 7:
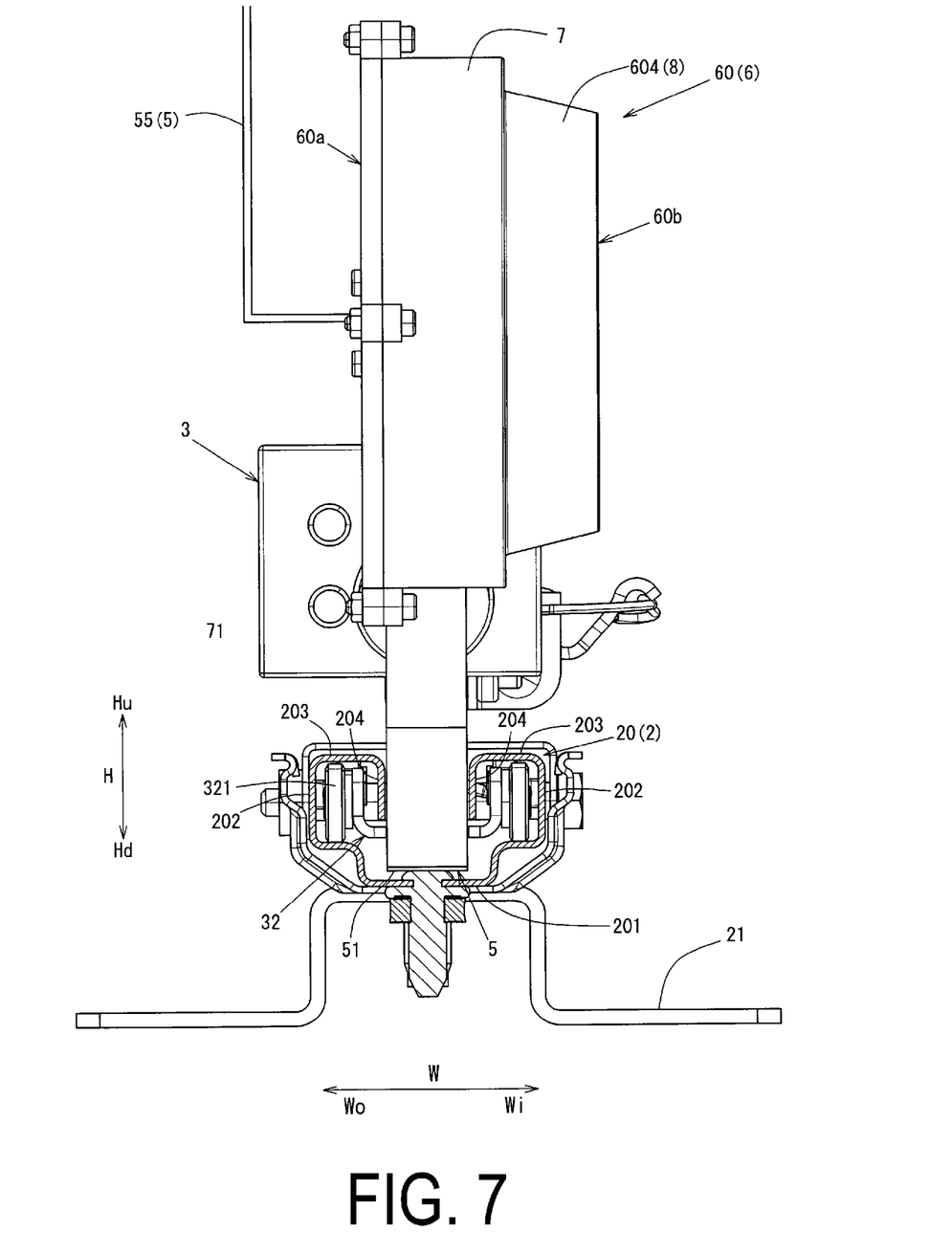
FIG. 7 is an enlarged diagram taken along line C-C of FIG. 3.

FIG. 1 is a schematic perspective view illustrating a seat slide structure 1, FIG. 2 is a schematic perspective view illustrating a flat cable routing structure 10, and FIG. 3 is an enlarged cross-section perspective view of a part a of FIG. 2 taken along line A-A. FIG. 4 is an exploded perspective view illustrating a cable take-up device 6, FIG. 5 is an enlarged sectional view taken along line B-B of FIG. 2, FIG. 6 is an explanatory diagram illustrating the cable take-up device 6, and FIG. 7 is an enlarged diagram taken along line C-C of FIG. 3.

Specifically, FIG. 3 is an enlarged view of the part a of FIG. 2, and illustrates a cover 60b in a see-through manner while the illustration of a rotation regulator 61, a spring case 63, and a spiral spring 64 is omitted. FIG. 4A is a perspective view as viewed from a vehicle width direction inside Wi, and FIG. 4B is a perspective view as viewed from a vehicle width direction outside Wo. FIG. 6A is a right side view illustrating the cable take-up device 6, and FIG. 6B is a left side view illustrating the cable take-up device 6. Note that the illustration of the cover 60b is omitted in FIG. 6A, and the illustration of a housing 60 is omitted in FIG. 6B.

Note that FIG. 1 illustrates a slide seat 4 in a see-through manner to specifically illustrate the structure of the flat cable routing structure 10. In addition, in FIGS. 3 to 7, a flexible flat cable 51 (hereinafter referred to as FFC 51) making up a cable routing member 5 has a thickness, but it is illustrated in a linear shape with no thickness in the cross-section and illustrated as being stacked with a space therebetween to clearly illustrate its routing state.

Note that the longitudinal direction of a fixed rail 2, that is, the back-forth direction of a slider 3 is a front-rear direction L, and the near side (in FIG. 1, the left near side) and the depth side (in FIG. 1, the right depth side) in the front-rear direction L are a forward direction Lf and a backward direction Lb, respectively, in the present embodiment. In addition, the direction orthogonal to the front-rear direction L in the horizontal plane is a width direction W. In addition, the facing direction of the two fixed rails 2 disposed with a predetermined distance therebetween in the width direction W is the vehicle width direction inside Wi, and its opposite direction is the vehicle width direction outside Wo. Further, the vertical direction in FIG. 1 is a height direction H, and the upward direction and downward direction in the height direction H are an upward direction Hu and a downward direction Hd, respectively.

As illustrated in FIG. 1, the seat slide structure 1 configured to make the slide seat 4 slidable in the front-rear direction L in the interior of a vehicle is composed of the two fixed rails 2 that are long in the front-rear direction L, the slider 3, and the slide seat 4.

The fixed rails 2 are fixed to the vehicle interior floor with a predetermined distance therebetween in the width direction W.

The slider 3 is mounted to each fixed rail 2 in a slidable manner in the front-rear direction L.

The slide seat 4 is slidably supported by the sliders 3 on both sides in the width direction W.

The fixed rail 2 that makes up the seat slide structure 1 in this manner is composed of a rail main body 20 with a groove shape in a cross section, and a fixing bracket 21 that fixes the rail main body 20 to the vehicle interior floor as illustrated in FIG. 7.

The rail main body 20 is composed of a rail bottom surface part 201 (see FIG. 7), a side wall part 202, a top surface part 203, and an inner wall part 204.

The rail bottom surface part 201 is formed in an inverted hat-shape in a cross section (see FIG. 7).

The side wall part 202 is provided on both sides of the rail bottom surface part 201 in the width direction W.

The top surface part 203 is formed to extend in opposite directions from the upper end of each side wall part 202.

The inner wall part 204 is formed to extend in the downward direction Hd from the opposite inner end portions of the top surface part 203.

Note that the inner wall parts 204 are provided with a predetermined distance therebetween in the width direction W, and the distance between the inner wall parts 204 in the width direction W is slightly greater than the width of the cable routing member 5 described later. In addition, while the illustration is omitted in the drawing, a rail plate for preventing entry of foreign matters into the rail main body 20 with a groove shape in a cross section is provided across the top surface parts 203 on both sides in the width direction W. Note that the rail plate is a deformable sheet member provided with a slit in the front-rear direction L at the center in the width direction W.

The fixing bracket 21 for fixing the rail main body 20 to the vehicle interior floor has a hat-shape in a cross-section, and fixes the portions on both sides in the width direction W to the vehicle interior floor by supporting the rail bottom surface part 201 of the rail main body 20 at the portion protruded in the upward direction Hu at the center in the width direction W. Note that a plurality of the fixing brackets 21 are disposed with a predetermined distance therebetween in the front-rear direction L. In addition, the structure of the rail main body 20 is not limited to the above-described structure as long as it is an appropriate structure that allows for the movement of the slider 3.

The slider 3 mounted in a slidable manner in the front-rear direction L with respect to the fixed rail 2 having the above-described configuration is composed of an upper part supporting part 31 that supports the slide seat 4 and an inner running part 32 disposed inside the rail main body 20 as illustrated in FIG. 7.

The upper part supporting part 31 is protruded to the upward direction Hu from the top surface part 203 of the rail main body 20 of the fixed rail 2.

The inner running part 32 includes a roller 321 that is disposed inside the rail main body 20 and configured to roll in the front-rear direction L.

In the seat slide structure 1 having the above-described configuration, the roller 321 rolls in the front-rear direction L inside the rail main body 20 of the fixed rail 2 disposed along the front-rear direction L, and thus the slider 3 can slide in the front-rear direction L with respect to the fixed rail 2. Thus, the slide seat 4 can slide in the front-rear direction L with respect to the fixed rail 2.

The seat slide structure 1 includes the flat cable routing structure 10 for supplying power to the slide seat 4 that is slidable in the front-rear direction L with respect to the fixed rail 2.

The flat cable routing structure 10 includes the cable routing member 5 routed along the fixed rail 2 disposed in the front-rear direction L, and the cable take-up device 6 that houses the cable routing member 5 such that the cable routing member 5 can be taken up and drawn.

The cable routing member 5 and the cable take-up device 6 are provided at one of the fixed rails 2 and the sliders 3 (in the present embodiment, the left side as viewed in the forward direction Lf) disposed with a predetermined distance therebetween in the width direction W in the seat slide structure 1.

The cable routing member 5 is composed of a plurality of the stacked FFCs 51, which are thin belt-shaped conductive materials composed of a plurality of rectangular conductors sandwiched with insulating laminate sheets. In addition, the cable routing member 5 composed of the FFC 51 is longer than the length of the fixed rail 2 in the front-rear direction L.

A front end portion 52 of the cable routing member 5 composed of the stacked FFC 51 is fixed to a fitting fixing part 53 that is fitted to a rail end portion 2X, which is the end portion of the fixed rail 2 in the forward direction Lf. A vehicle body side connector 54, which is fitted and connected to the vehicle body side power-feeding connector, is protruded from the fitting fixing part 53, and the vehicle body side connector 54 and the FFC 51 making up the cable routing member 5 are connected to each other in a conductive manner inside the fitting fixing part 53.

Note that as illustrated in FIG. 6, the front end portion 52 of the cable routing member 5 is fixed to the fitting fixing part 53. In this manner, the cable routing member 5 with the front end portion 52 fixed to the fitting fixing part 53 fitted to the rail end portion 2X is fixed to the rail end portion 2X through the fitting fixing part 53.

A rear end portion 55 of the cable routing member 5 is extended toward the slide seat 4 and is fixed to the slide seat 4.

In this manner, in the cable routing member 5, the portion between the front end portion 52 fixed to the rail end portion 2X and the rear end portion 55 fixed to the slide seat 4 is a housed portion 56 that is housed in a take-up housing part 7 described later.

As illustrated in FIG. 4, the cable take-up device 6 that houses the housed portion 56 of the cable routing member 5 such that the housed portion 56 can be taken up and drawn is composed of the housing 60, the rotation regulator 61, a fixing shaft 62, the spring case 63, and the spiral spring 64.

The housing 60 is formed by assembling a base 60a and the cover 60b in the width direction W. The housing 60 has a drop shape sharp-pointed downward in the backward direction Lb as viewed from the width direction W, and the lower end in the backward direction Lb is a cable port 601.

The base 60a is provided with an outlet 602 that outputs the rear end portion 55 to the outside on the vehicle width direction outside Wo, at a portion near the center in side view. In addition, in the forward direction Lf of the cable port 601, a cable guide 603 provided upright with an upper end portion 603a bent in the forward direction Lf is provided.

The cover 60b includes a spring housing part 604 with a lateral truncated cone shape protruding to the vehicle width direction inside Wi on the side opposite to the base 60a.

The rotation regulator 61 is composed of a disk part 611 on the vehicle width direction inside Wi and a cylindrical part 612 on the vehicle width direction outside Wo integrated with each other. The disk part 611 is formed in a circular shape with a diameter one size smaller than the arc portion in the housing 60 formed in a drop shape. Note that the disk part 611 is provided with a through hole 613 through which the fixing shaft 62 described later can pass.

The cylindrical part 612 has a cylindrical shape that is open on the vehicle width direction outside Wo with a diameter smaller than the disk part 611.

Note that a slit 614 through which the cable routing member 5 can pass is provided at a part of the cylindrical part 612 in the circumferential direction.

The cylindrical part 612 in which the slit 614 is formed as described above functions as a partition wall as a partition between an inner installation portion 57 and an outer installation portion 58 in the housed portion 56 described later, and the portion between the inner installation portion 57 and the outer installation portion 58 can pass through the slit 614 formed in the cylindrical part 612.

Note that a clip 59 for preventing the spreading of the cable routing member 5 composed of the plurality of stacked FFCs 51 is provided at a portion near the slit 614 at the outer installation portion 58 in the cable routing member 5.

The fixing shaft 62 fixes the center of the spiral spring 64 described later.

The fixing shaft 62 is composed of a column main body part 621 with a columnar shape fixed to the outlet 602 of the base 60a and a small diameter columnar part 622 that extends in the vehicle width direction inside Wi from the column main body part 621.

A through slit 623 through which the rear end portion 55 of the cable routing member 5 output from the outlet 602 passes is provided on the vehicle width direction inside Wi of the column main body part 621. The small diameter columnar part 622 is configured to extend through the spring case 63 described later in the width direction W, and grab a center side end portion 641 of the spiral spring 64 disposed inside the spring case 63.

The spring case 63 is composed of a first case 63a on the vehicle width direction outside Wo and a second case 63b on the vehicle width direction inside Wi.

The first case 63a is composed of a circular plate part 631 on the vehicle width direction outside Wo, a circular shape rib 632 formed on the vehicle width direction outside Wo of the circular plate part 631, a periphery rib 633 formed along the peripheral portion, and a plurality of radial direction ribs 634 connecting the circular shape rib 632 and the periphery rib 633 in the radial direction.

A center hole 635 to which the small diameter columnar part 622 of the fixing shaft 62 is inserted is provided at a center of the first case 63a. A grabbing rib 636 that grabs the outer periphery side end portion of the spiral spring 64 along the circular shape rib 632 is provided at a part of the circular shape rib 632 in the circumferential direction.

The second case 63b is configured to be symmetric with the first case 63a in the direction L. Therefore, the same configurations are denoted with the same reference numerals and the description thereof will be omitted.

When the first case 63a and the second case 63b configured to be symmetric with the first case 63a in the direction L are assembled so as to face each other in the width direction W, a disk-shaped installation space 637 for placing the spiral spring 64 is formed on the radial inside of the circular shape rib 632.

A grabbing groove (omitted in the drawing) of the grabbing rib 636 is formed along the outer periphery of the installation space 637. Note that the spring case 63 has a diameter smaller than the spring housing part 604 in the cover 60b and a height smaller than the spring housing part 604.

The spiral spring 64 is composed of a wound belt-shaped spring steel, and is disposed in an installation space 637 of the spring case 63. The end portion on the center side is the center side end portion 641, and the end portion on the radial outside is a radial outside end portion 642.

Next, a method of assembling the cable take-up device 6 is described.

The spiral spring 64 is disposed on the radial inside of the circular shape rib 632 of one of the first case 63a and the second case 63b. Here, the radial outside end portion 642 of the spiral spring 64 is disposed at the grabbing rib 636.

The spring case 63 is formed by assembling the first case 63a and the second case 63b. At this time, the spiral spring 64 is disposed in the installation space 637, and the radial outside end portion 642 can be grabbed by the grabbing groove composed of the grabbing rib 636.

In addition, in the cable routing member 5 wound in a spiral form, the inner installation portion 57 is disposed on the radial inside of the cylindrical part 612 in the rotation regulator 61, and the outer installation portion 58 is disposed on the radial outside of the cylindrical part 612.

At this time, the portion between the inner installation portion 57 and the outer installation portion 58 passes through the slit 614 provided in the cylindrical part 612. In addition, the inner installation portion 57 and the outer installation portion 58 are disposed in the state where they are wound in the same direction.

The small diameter columnar part 622 of the fixing shaft 62 is inserted to the through hole 613 of the rotation regulator 61 where the cable routing member 5 is disposed. Then, the small diameter columnar part 622 of the fixing shaft 62 is inserted to the center hole 635 and the fixing shaft 62 is disposed between the disk part 611 of the rotation regulator 61 and the spring case 63.

In this manner, the cable routing member 5, the rotation regulator 61, the fixing shaft 62 and the spring case 63 are assembled.

At this time, the center side end portion 641 of the spiral spring 64 is fixed to the small diameter columnar part 622 of the fixing shaft 62. Then, the rear end portion 55 of the cable routing member 5 goes through the through slit 623 of the fixing shaft 62.

Subsequently, the base 60a and the cover 60b are assembled such that the cable routing member 5, the rotation regulator 61, the fixing shaft 62, the spring case 63 and the spiral spring 64 assembled in the above-described manner are disposed inside the housing 60.

Specifically, the cable routing member 5 is assembled to the base 60a such that the rear end portion 55 passes through the outlet 602 and that the front end portion 52 is drawn from the cable port 601. At this time, the column main body part 621 of the fixing shaft 62 is fixed to the base 60a. In this manner, the center side end portion 641 of the spiral spring 64 is fixed to the housing 60 through the fixing shaft 62. At this time, the outer installation portion 58 is disposed in a predetermined space formed between the upper end portion 603a of the cable guide 603 and the disk part 611.

Further, the housing 60 is formed by assembling the cover 60b to the base 60a where the cable routing member 5, the rotation regulator 61, the fixing shaft 62, the spring case 63 and the spiral spring 64 are assembled. The spring case 63 and the spiral spring 64 are disposed inside the spring housing part 604 in the cover 60b of the housing 60 having the above-described configuration.

In addition, the rotation regulator 61 and the spring case 63 are fixed. In this manner, the cable take-up device 6 is formed with the cable routing member 5, the rotation regulator 61, the fixing shaft 62, the spring case 63 and the spiral spring 64 disposed inside the housing 60.

In the cable take-up device 6 having the above-described configuration, the vehicle width direction outside Wo than the rotation regulator 61 where the cable routing member 5 is disposed functions as the take-up housing part 7, while the vehicle width direction inside Wi than the rotation regulator 61 where the spring case 63 and the spiral spring 64 are disposed functions as a take-up force generation part 8.

In addition, the cable take-up device 6 is mounted on the forward direction Lf side of the slider 3. Then, the cable take-up device 6 is mounted to the slider 3 such that the cable port 601 is on the lower side in the backward direction Lb, that is, the cable port 601 faces downward on the slider 3 side. Then, the cable routing member 5 is drawn in the downward direction Hd from the cable port 601, and extended into the rail main body 20.

Specifically, when the slider 3 moves in the backward direction Lb with respect to the fixed rail 2, the cable routing member 5 is drawn from the cable take-up device 6. The cable routing member 5 is drawn such that the outer installation portion 58 disposed on the radial outside of the cylindrical part 612 of the rotation regulator 61 is unwound and drawn from the cable port 601.

At this time, the outer installation portion 58 is guided by the cable guide 603 to the cable port 601, and smoothly drawn. In addition, the upper end portion 603a of the cable guide 603 is bent toward the forward direction Lf, and thus the outer installation portion 58 disposed on the radial outside than the cylindrical part 612 is prevented from being inadvertently unwound and disturbed.

When the outer installation portion 58 is drawn, the rotation regulator 61 rotates, and the inner installation portion 57 disposed on the radial inside of the cylindrical part 612 is wound up. In addition, the spring case 63 also rotates along with the rotation of the rotation regulator 61 in conjunction with the drawing of the outer installation portion 58, and thus the rotation of the center side end portion 641 is fixed to the base 60a, and, the spiral spring 64 with the radial outside end portion 642 grabbed at the grabbing groove is also wound up.

Note that when the take-up of the inner installation portion 57 is completed, excessive rotation of the outer installation portion 58 in the unwound direction is regulated.

Conversely, when the slider 3 moves in the forward direction Lf with respect to the fixed rail 2, the cable routing member 5 extended into the rail bottom surface part 201 is taken up.

Specifically, with the biasing force of the spiral spring 64 wound up through the drawing of the outer installation portion 58, the spiral spring 64 is wound down so as to rotate the rotation regulator 61, and the drawn cable routing member 5 is wound on the radial outside of the cylindrical part 612 as the outer installation portion 58.

At this time, the inner installation portion 57 on the radial inside of the cylindrical part 612 is wound down as with the spiral spring 64. Note that the radial outside of the wound-down inner installation portion 57 is regulated with the cylindrical part 612, and thus the excessive rotation of the outer installation portion 58 in the take-up direction can be regulated.

In this manner, in the flat cable routing structure 10 using the cable take-up device 6, the cable routing member 5 is routed for the slide seat 4 slidably supported so as to be movable back and forth along the direction L of the fixed rail 2 fixed to the vehicle interior floor. The front end portion 52 of the cable routing member 5 is fixed to the rail end portion 2X of the fixed rail 2, and the rear end portion 55 of the cable routing member 5 is fixed to the slide seat 4.

In addition, the cable take-up device 6 includes the take-up housing part 7 that takes up the housed portion 56 between the front end portion 52 and the rear end portion 55 in the cable routing member 5 in a drawable manner and houses the housed portion 56 inside the take-up housing part 7, the take-up force generation part 8 that generates a take-up force in a direction of take-up of the housed portion 56 through drawing of the cable routing member 5, and the slit 614 that applies the take-up force of the take-up force generation part 8 to the housed portion 56.

Further, in the cable take-up device 6, the rear end portion 55 is output to the outside of the vehicle width direction outside Wo from the take-up center of the take-up housing part 7, and the take-up force generation part 8 is disposed on the vehicle width direction inside Wi in the take-up center axis direction of the take-up housing part 7. Thus, with a compact structure, the cable take-up device 6 can supply power to the slide seat 4 through the cable routing member 5.

Specifically, the cable take-up device 6 includes the take-up housing part 7, the take-up force generation part 8, and the slit 614.

The take-up housing part 7 takes up the housed portion 56 of the cable routing member 5 in a drawable manner and houses the housed portion 56 inside.

The take-up force generation part 8 generates a take-up force in a direction of take-up of the housed portion 56 through drawing of the cable routing member 5.

The slit 614 applies the take-up force of the take-up force generation part 8 to the housed portion 56.

In the take-up housing part 7, the take-up force generation part 8 is disposed on the vehicle width direction inside Wi, which is the side opposite to the side from which the rear end portion 55 is output to the outside from the take-up center.

In this manner, it is possible to form, in a compact form, the cable take-up device 6 that can supply power following the movement of the slide seat 4 by take-up and drawing the cable routing member 5 with the take-up force of the take-up force generation part 8 with respect to the slide of the slide seat 4 with respect to the fixed rail 2.

In addition, in the housed portion 56, the portion disposed on the radial inside of the slit 614 that regulates the intermediate portion is the inner installation portion 57, and the portion disposed on the radial outside of the slit 614 is the outer installation portion 58. The inner installation portion 57 and the outer installation portion 58 are wound in the same direction and housed, and the inner installation portion 57 is wound up when the outer installation portion 58 is unwound while the inner installation portion 57 is wound down when the outer installation portion 58 is taken up. Thus, the outer installation portion 58 of the housed portion 56 can be drawn by unwinding, or can be wound along with the movement of the slide seat 4.

In addition, the inner installation portion 57 can be wound up or wound down through the drawing or take-up of the outer installation portion 58 along with the movement of the slide seat 4.

In addition, when the outer installation portion 58 of the housed portion 56 is unwound and drawn from the take-up housing part 7 along with the movement of the slide seat 4, the inner installation portion 57 is wound up on the radial inside of the slit 614, and thus the restoration force of the wound-up inner installation portion 57 acts on the outer installation portion 58 in the direction opposite to the drawing direction.

Additionally, if the take-up of the inner installation portion 57 is completed when the outer installation portion 58 is unwound and taken up from the take-up housing part 7, it is possible to regulate a situation where the outer installation portion 58 is further unwound and drawn with the wound-up inner installation portion 57.

That is, the wound-up inner installation portion 57 operates as a so-called stopper at the time of further drawing the outer installation portion 58, and thus excessive drawing of the outer installation portion 58 can be prevented.

Conversely, when the outer installation portion 58 is taken up and pulled back to the take-up housing part 7 along with the movement of the slide seat 4, the inner installation portion 57 is wound down on the radial inside of the slit 614 so as to make contact with the slit 614, and the resilience of the unwound inner installation portion 57 acts on the outer installation portion 58 in the direction opposite to the pulling back direction.

In this manner, the resilience of the inner installation portion 57 wound down and brought into contact with the slit 614 acts on the outer installation portion 58, and thus it is possible to regulate the situation where the outer installation portion 58 is further taken up and pulled back to the take-up housing part 7.

That is, the wound-down inner installation portion 57 operates as a so-called stopper at the time of further pulling back the outer installation portion 58, and thus excessive pull-back of the outer installation portion 58 can be prevented.

In this manner, the inner installation portion 57 is wound up and wound down by the drawing and pull-back of the outer installation portion 58. As a result, the elastic force acting on the inner installation portion 57 acts on the drawn or pulled-back outer installation portion 58 in the opposite direction, and thus the force in the direction of the drawing and pulling of the outer installation portion 58 can be relieved.

Further, the inner installation portion 57 can operate as a so-called stopper at the time of drawing or pulling back the outer installation portion 58.

In addition, in the take-up housing part 7, the cylindrical part 612 is provided between the outer installation portion 58 and the inner installation portion 57 housed in a wound state, and the cylindrical part 612 is provided with the slit 614 through which the housed portion 56 can pass in the radial direction.

Thus, the inner installation portion 57 and the outer installation portion 58 can be sectioned in the radial direction with the cylindrical part 612. In addition, by passing the housed portion 56 through the slit 614 provided in the cylindrical part 612, the cable routing member 5 can be taken up and drawn by applying the take-up force of the take-up force generation part 8 to the housed portion 56 at the slit 614.

In addition, the disk part 611 is provided on the vehicle width direction inside Wi in the take-up housing part 7, the cylindrical part 612 is provided in the disk part 611, and the disk part 611 is rotated relative to the take-up housing part 7. In this manner, the cylindrical part 612 that sections the inner installation portion 57 and the outer installation portion 58 in the radial direction rotates integrally with the disk part 611. Thus, the inner installation portion 57 can be reliably rotated, and the take-up and take-up down can be achieved.

In addition, the cable routing member 5 is composed of a plurality of the stacked FFCs 51, and the clip 59 for bundling the stacked housed portion 56 is provided at the inner installation portion 57 near the boundary between the inner installation portion 57 and the outer installation portion 58.

Thus, the stacked cable routing member 5 does not spread out, and the inner installation portion 57 can be wound up and wound down on the radial inside of the slit 614.

In addition, the take-up force generation part 8 includes the spiral spring 64 that generates a take-up force by being wound up through unwinding of the outer installation portion 58, and the outer installation portion 58 is longer than the take-up-up length of the spiral spring 64. Thus, the take-up force can be reliably achieved with the spiral spring 64 with a simple structure, and power can be supplied following the movement of the slide seat 4 by take-up and drawing the cable routing member 5 with the take-up force of the take-up force generation part 8.

In addition, since the outer installation portion 58 is longer than the take-up-up length of the spiral spring 64, it is possible to prevent a situation where the outer installation portion 58 is damaged by being wound over the take-up amount and the unwinding amount as in the case where the take-up-up length of the spiral spring 64 is longer.

In addition, the take-up housing part 7 is attached to the slider 3 that slides forward/backward with respect to the fixed rail 2. Thus, the cable take-up device 6 configured in a compact form can supply power following the movement of the slide seat 4 by take-up and drawing the cable routing member 5 with the take-up force of the take-up force generation part 8 along with the slide of the slide seat 4 with respect to the fixed rail 2.

The configuration of the disclosure and the above-described embodiments correspond to each other as follows:
- the vehicle body of the disclosure corresponds to the vehicle interior floor;
- the fixed rail corresponds to the fixed rail 2;
- the longitudinal direction corresponds to the direction L;
- the slide seat corresponds to the slide seat 4;
- the flexible flat cable corresponds to the cable routing member 5;
- the cable take-up device corresponds to the cable take-up device 6;
- the first cable end portion corresponds to the front end portion 52;
- the first rail end portion corresponds to the rail end portion 2X;
- the second cable end portion corresponds to the rear end portion 55;
- the housed portion corresponds to the housed portion 56;
- the take-up housing part corresponds to the take-up housing part 7;
- the take-up force generation part corresponds to the take-up force generation part 8;
- the take-up force application part corresponds to the slit 614;
- the regulation part corresponds to the slit 614;
- the inner installation portion corresponds to the inner installation portion 57;
- the outer installation portion corresponds to the outer installation portion 58;
- the partition wall corresponds to the cylindrical part 612;
- the passage part corresponds to the slit 614;
- the side surface part corresponds to the disk part 611;
- the bundling part corresponds to the clip 59;
- the spiral spring corresponds to the spiral spring 64;
- the moving body corresponds to the slider 3; and
- the flat cable routing structure for a slide seat corresponds to the flat cable routing structure 10.

Note that the disclosure is not limited to the configurations of the above-described embodiments, and various embodiments may be made.

For example, while the cable routing member 5 is composed of a plurality of the stacked FFCs 51 in the description above, the cable routing member 5 may be configured by stacking a thin piece member harder than the FFC 51 on the FFC 51. Furthermore, instead of the thin piece member, a dummy cable including no conductor may be stacked on the FFC 51 as the cable routing member 5.

In addition, while the front end portion 52 is fixed at the rail end portion 2X, which is the end portion in the forward direction Lf of fixed rail 2 disposed along the front-rear the direction L in the description above, the front end portion 52 may be fixed to the end portion of the fixed rail 2 in the backward direction Lb. In this case, it suffices that the cable take-up device 6 is mounted on the backward direction Lb side of the slider 3.

In addition, the front end portion 52 may be fixed near the rail end portion 2X without fixing the front end portion 52 to the rail end portion 2X. Furthermore, while the cable take-up device 6 is attached to the slider 3 above, it may be fixed to the rail end portion 2X of the fixed rail 2. In this case, the front end portion 52 is attached to the slide seat 4 and the rear end portion 55 output from the cable take-up device 6 is fixed to the rail end portion 2X.

In the description above, the inner installation portion 57 disposed on the radial inside of the cylindrical part 612 and the outer installation portion 58 disposed on the radial outside are wound in the same direction and housed, and the inner installation portion 57 is wound up when the outer installation portion 58 is unwound whereas the inner installation portion 57 is wound down when the outer installation portion 58 is taken up. Alternatively, the inner installation portion 57 and the outer installation portion 58 may be wound in opposite directions and housed such that the inner installation portion 57 is wound down when the outer installation portion 58 is unwound whereas the inner installation portion 57 is wound up when the outer installation portion 58 is taken up.

In this case, the inner installation portion 57 is wound down when the outer installation portion 58 is unwound, and the inner installation portion 57 is wound up when the outer installation portion 58 is wound. Thus, the circumference difference of the wound inner installation portion 57 and outer installation portion 58 can be accommodated.

Additionally, if the take-up of the inner installation portion 57 is completed when the outer installation portion 58 is taken up and pulled back to the take-up housing part 7, it is possible to regulate a situation where the outer installation portion 58 is further pulled back with the wound-up inner installation portion 57.

That is, the wound-up inner installation portion 57 operates as a so-called stopper at the time of pulling back the outer installation portion 58, and thus excessive pull-back of the outer installation portion 58 can be prevented.

Conversely, when the outer installation portion 58 is unwound and drawn from the take-up housing part 7 along with the movement of the slide seat 4, the inner installation portion 57 is wound down on the radial inside of the regulation part and brought into contact with the slit 614, and the resilience of the unwound inner installation portion 57 acts on the outer installation portion 58 in the direction opposite to the pulling back direction.

In this manner, the resilience of the inner installation portion 57 wound down and brought into contact with the slit 614 acts on the outer installation portion 58, and thus it is possible to regulate a situation where the outer installation portion 58 is further unwound and drawn from the take-up housing part 7.

That is, the wound-down inner installation portion 57 operates as a so-called stopper at the time of drawing the outer installation portion 58, and thus excessive drawing of the outer installation portion 58 can be prevented.

In addition, while the cylindrical disk part 611 is provided in the rotation regulator 61 and the slit 614 through which the cable routing member 5 passes is formed in the disk part 611 above, it is also possible to section the inner installation portion 57 and the outer installation portion 58 in the radial direction by concentrically placing a plurality of pins instead of the disk part 611.

Note that while the take-up force generation part 8 is provided with the spiral spring 64 that generates the take-up force by being wound up by the unwinding of the outer installation portion 58 in the above-described cable take-up device 6, it may be composed of a torsion spring, a torsion coil spring, a spiral torsion spring and the like.

REFERENCE NUMBER

2 . . . Fixed rail
2X . . . Rail end portion
3 . . . Slider
4 . . . Slide seat
5 . . . Cable routing member
6 . . . Cable take-up device
7 . . . Take-up housing part
8 . . . Take-up force generation part
10 . . . Flat cable routing structure
52 . . . Front end portion
55 . . . Rear end portion
56 . . . Housed portion
57 . . . Inner installation portion
58 . . . Outer installation portion
59 . . . Clip
64 . . . Spiral spring
611 . . . Disk part
612 . . . Cylindrical part
614 . . . Slit
L . . . Direction

The invention claimed is:

1. A cable take-up device for a flexible flat cable routed for a slide seat slidably supported to be movable forward and backward along a longitudinal direction of a fixed rail fixed to a vehicle body, the cable take-up device comprising:
   a take-up housing part configured to take up a housed portion in a drawable manner and house the housed portion inside the take-up housing part with a first cable end portion fixed to a side of a first rail end portion and a second cable end portion fixed to the slide seat, the first cable end portion being one end portion of the flexible flat cable, the first rail end portion being one end of the fixed rail, the second cable end portion being another end portion of the flexible flat cable, the housed portion being a portion of the flexible flat cable between the first cable end portion and the second cable end portion;
   a fixing shaft disposed along a take-up center axis direction of the take-up housing part inside the take-up housing part;
   a rotation regulator configured to apply take-up force to the housed portion by being rotated around the fixing shaft inside the take-up housing part;
   a spring case fixed to the rotation regulator inside the take-up housing part and configured to be rotated around the fixing shaft together with the rotation regulator; and
   a spiral spring grabbed by the spring case and the fixing shaft inserted to the spring case, the spiral spring configured to generate take-up force in a direction of take-up the housed portion through drawing of the flexible flat cable, wherein
   one of the first cable end portion and the second cable end portion is output to an outside from a take-up center of the take-up housing part, and
   the spring case in which the spiral spring is housed is fixed to a side surface part of the rotation regulator on an opposite side opposite to a side on which the one of the first cable end portion and the second cable end portion is output to the outside in the take-up center axis direction.

2. The cable take-up device according to claim 1, wherein the rotation regulator includes a regulation part configured to regulate an intermediate portion of the housed portion,
   of the housed portion, a portion disposed on a radial inside of the regulation part is defined as an inner installation portion and a portion disposed on a radial outside of the regulation part is defined as an outer installation portion,
   the inner installation portion and the outer installation portion of the housed portion are wound in the same direction and housed, and
   the inner installation portion is wound up when the outer installation portion is unwound whereas the inner installation portion is wound down when the outer installation portion is taken up.

3. The cable take-up device according to claim 1, wherein the rotation regulator includes a regulation part configured to regulate an intermediate portion of the housed portion,
   of the housed portion, a portion disposed on a radial inside of the regulation part is defined as an inner installation portion, and a portion disposed on a radial outside of the regulation part is defined as an outer installation portion,
   the inner installation portion and the outer installation portion are wound in opposite directions and housed, and
   the inner installation portion is wound down when the outer installation portion is unwound whereas the inner installation portion is wound up when the outer installation portion is taken up.

4. The cable take-up device according to claim 2, wherein a partition wall is provided between the inner installation portion and the outer installation portion;
   a passage part through which the housed portion passes in a radial direction is provided in the partition wall; and
   the passage part includes the regulation part.

5. The cable take-up device according to claim 4, wherein the side surface part is provided on the opposite side in the rotation regulator,
   the partition wall is provided at the side surface part, and
   the side surface part rotates relative to the take-up housing part.

6. The cable take-up device according to claim 2, wherein a plurality of the flexible flat cables are stacked; and
   a bundling part configured to bundle the housed portion that is stacked is provided at the inner installation portion near a boundary between the inner installation portion and the outer installation portion.

7. The cable take-up device according to claim 2, wherein the spiral spring generates the take-up force by being wound up through unwinding of the outer installation portion.

8. The cable take-up device according to claim 7, wherein the outer installation portion is formed to be longer than a take-up-up length of the spiral spring.

9. The cable take-up device according to claim 1, wherein the take-up housing part is fixed to one of end portions of the fixed rail, or a moving body configured to support the slide seat and slide in a back-forth direction with respect to the fixed rail.

10. A flat cable routing structure for a slide seat, comprising:
the cable take-up device according to claim 1;
the fixed rail fixed to the vehicle body;
a moving body configured to slidably support the slide seat such that the slide seat is movable back and forth along a longitudinal direction of the fixed rail, the cable take-up device being fixed to the moving body; and
the flexible flat cable configured to be taken up by the cable take-up device in a drawable manner with the first cable end portion fixed on the side of the first rail end portion and the second cable end portion fixed to the slide seat, wherein
the flexible flat cable is routed for the slide seat slidably supported so as to be movable back and forth along a longitudinal direction of the fixed rail.

11. The cable take-up device according to claim 3, wherein
a partition wall is provided between the inner installation portion and the outer installation portion;
a passage part through which the housed portion passes in a radial direction is provided in the partition wall; and
the passage part includes the regulation part.

12. The cable take-up device according to claim 11, wherein
the side surface part is provided on the opposite side in the rotation regulator,
the partition wall is provided at the side surface part, and
the side surface part rotates relative to the take-up housing part.

13. The cable take-up device according to claim 11, wherein
a plurality of the flexible flat cables are stacked; and
a bundling part configured to bundle the housed portion that is stacked is provided at the inner installation portion near a boundary between the inner installation portion and the outer installation portion.

14. The cable take-up device according to claim 11, wherein the spiral spring generates the take-up force by being wound up through unwinding of the outer installation portion.

15. The cable take-up device according to claim 14, wherein the outer installation portion is formed to be longer than a take-up-up length of the spiral spring.

* * * * *